United States Patent [19]

Asano

[11] Patent Number: 5,386,537
[45] Date of Patent: Jan. 31, 1995

[54] SYSTEM WITH REDUCED INSTRUCTION SET PROCESSOR ACCESSING PLURAL MEMORIES AT DIFFERENT SPEEDS USING BANK INTERLEAVING

[75] Inventor: Eiji Asano, Sakai, Japan

[73] Assignee: Minolta Camera Kabushiki Kaisha, Osaka, Japan

[21] Appl. No.: 766,524

[22] Filed: Sep. 27, 1991

[30] Foreign Application Priority Data

Mar. 28, 1991 [JP] Japan .................................. 3-091315
Mar. 28, 1991 [JP] Japan .................................. 3-091316

[51] Int. Cl.⁶ ............................................ G06F 13/00
[52] U.S. Cl. .................................. 395/425; 364/240.3; 364/239.5; 364/232.23; 364/254; 364/DIG. 1; 395/800
[58] Field of Search ................. 395/650, 425, 800, 375

[56] References Cited

U.S. PATENT DOCUMENTS 4,953,082  8/1990  Nomura ............................... 395/650
5,097,437  3/1992  Larson ................................. 395/775
5,247,644  9/1993  Johnson ............................... 395/425
5,287,470  2/1994  Simpson .............................. 395/425

OTHER PUBLICATIONS

Am29000 Memory Design Handbook, Mark McLain, and Sherman Lee; 1989 Advanced Micro Devices.
Introducing the Intel i860 64-Bit Microprocessor, IEEE, 1989 Aug., pp. 15-30.

Primary Examiner—Eric Coleman
Attorney, Agent, or Firm—Burns, Doane, Swecker & Mathis

[57] ABSTRACT

A data processor adopts a CPU that is represented by an RISC type CPU and capable of processing one instruction in one clock cycle. The data processor has an instruction bus and a data bus independently of each other and includes an EPROM connected to the instruction bus and a DRAM connected to the data bus. The RISC type CPU accesses the EPROM with no wait states and the DRAM with one wait state.

28 Claims, 7 Drawing Sheets

| | CLOCK FREQUENCY | INSTRUCTION ACCESS | | DATA ACCESS (WAIT STATES) | RELATIVE RATIO OF PERFORMANCE |
|---|---|---|---|---|---|
| | | ONLY FIRST TIME (WAIT STATES) | BURST (WAIT STATES) | | |
| MA 120ns EPROM 100ns DRAM | 20MHz 16MHz 12.5MHz | 3 3 2 | 1 1 0 | 2 2 1 | 1.04 0.83 1.00 |
| MB 90ns EPROM 80ns DRAM | 20MHz 16MHz 12.5MHz | 3 2 2 | 1 0 0 | 2 1 1 | 1.04 1.28 1.00 |
| MC 70ns EPROM 60ns DRAM | 20MHz 16MHz 12.5MHz | 2 2 1 | 0 0 0 | 1 1 1 | 1.60 1.28 1.15 |

SYSTEM WITH REDUCED INSTRUCTION SET PROCESSOR ACCESSING PLURAL MEMORIES AT DIFFERENT SPEEDS USING BANK INTERLEAVING

BACKGROUND OF THE INVENTION

1. Field of the Invention

The present invention relates generally to data processors using CPUs capable of processing one instruction in one clock cycle as represented by RISC type CPUs and data processing methods thereof and, more particularly, to an inexpensive data processor with higher processing speed and a data processing method thereof.

2. Description of the Related Art

In general, a page printer analyzes print data or control data applied from a host, then processes the analyzed data as a bit image into a bit-map memory and prints the processed image data on paper by a printer engine.

In order to process the data from the host into the bit image, a printer controller (data processor) is employed, the processing speed of which greatly affects the throughput of the entire printer.

In recent years, a page printer that employs PDL (Page Description Language) such as Postscript as control language has rapidly been popular. This PDL printer can enlarge or rotate characters very easily as compared to a PCL printer using PCL (Printer Control language); however, it takes time to process data into a bit image, resulting in two great disadvantages, a lower output speed and a higher cost.

For further propagation of the PDL printer, a low-cost printer controller with higher processing speed must be developed in the future.

A CISC (Complex Instruction Set Computer) type CPU such as a 68020 processor manufactured by Motorola Inc. for example, is used in a printer controller of a conventional PDL printer.

While the CISC type CPU achieves an efficient execution of a high level language since a set of complicated instructions are added, it requires at least three clock cycles for processing one instruction and hence takes a considerable time to process data into a bit image.

For example, it takes approximately 80 seconds to describe an image for an evaluation test that includes both text and images, called "Ventura Scoop" in Postscript and then process data thereof into a bit image. An output time for the page printer is a total time that file transfer time and paper conveying time are added to this process time.

Since the throughput of the printer engine is usually about 4 to 40 (sheets/min), the process time of 80 seconds required to process the data into the bit image is too long even for a lower-speed printer engine.

Thus, a conventional printer controller (data processor) must achieve higher clock frequencies in order to increase the processing speed. If the higher clock frequencies are achieved, SRAMs that operate at a higher speed but are expensive must be used as memory devices, and memories that operate at a higher speed should be used also as other peripheral devices. This results in higher costs and other numerous problems to be solved in circuit design.

SUMMARY OF THE INVENTION

One object of the present invention is to increase a processing speed in a data processor.

Another object of the present invention is to increase a processing speed and reduce a cost in a data processor using an RISC type CPU.

A further object of the present invention is to increase a processing speed in a data processing method employing an RISC type CPU.

The foregoing objects of the present invention are accomplished by a data processor including the following elements. More specifically, a data processor according to the present invention includes: a central processing unit having an instruction bus and a data bus independently of each other and capable of processing one instruction in one clock cycle; an instruction memory connected to the instruction bus for storing an instruction instructing the processing contents to be executed by the central processing unit; a data memory connected to the data bus for storing data to be processed by the central processing unit in accordance with the instruction; a first controller for controlling the central processing unit to make access to the instruction memory with no wait states; and a second controller for controlling the central processing unit to make access to the data memory with one wait state.

Since the central processing unit capable of processing one instruction in one clock cycle is used, the instruction bus and the data bus are separately accessible and the instruction access has priority over the data access, the performance of the central processing unit is fully implemented. Consequently, processing speed can be increased in the data processor.

According to another aspect of the present invention, a data processor includes: a clock generator for generating a clock signal of a predetermined cycle; an RISC type CPU for executing a predetermined program in synchronization with a clock signal and capable of processing one instruction in one clock cycle defined by the clock signal; an instruction memory for storing a program to be executed by the CPU; a data memory for storing data to be processed by the CPU in accordance with the instruction; a first controller for controlling the CPU and the instruction memory so as to make the CPU access to the instruction memory for each clock cycle; and a second controller for controlling the CPU and the data memory so as to make the CPU access to the data memory for every two clock cycles. Since the RISC type CPU makes access to the instruction memory for every one clock cycle and to the data memory for every two clock cycles, the performance of the RISC type CPU is sufficiently implemented, and a memory with a longer access time can be adopted as the data memory. This makes it possible to provide an inexpensive data processor with a higher processing speed using the RISC type CPU.

According to still another aspect of the present invention, a control method of a data processor, including a central processing unit having an instruction bus and a data bus independently and capable of processing one instruction in one clock cycle, an instruction memory connected to the instruction bus for storing an instruction for instructing the processing contents to be executed by the central processing unit, and a data memory connected to the data bus for storing data to be processed by the central processing unit in accordance with the instruction, includes the steps of: controlling the central processing unit to make access to the instruction memory with no wait states; and controlling the central processing unit so as to make access to the data memory with one wait state. Since the instruction bus and the data bus are accessed separately from each other and the instruction access has priority over the data access, the performance of the central processing unit is sufficiently implemented in the control method of the data processor. Consequently, data processing speed can be increased in the control method of the data processor using the CPU capable of processing one instruction in one clock cycle.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
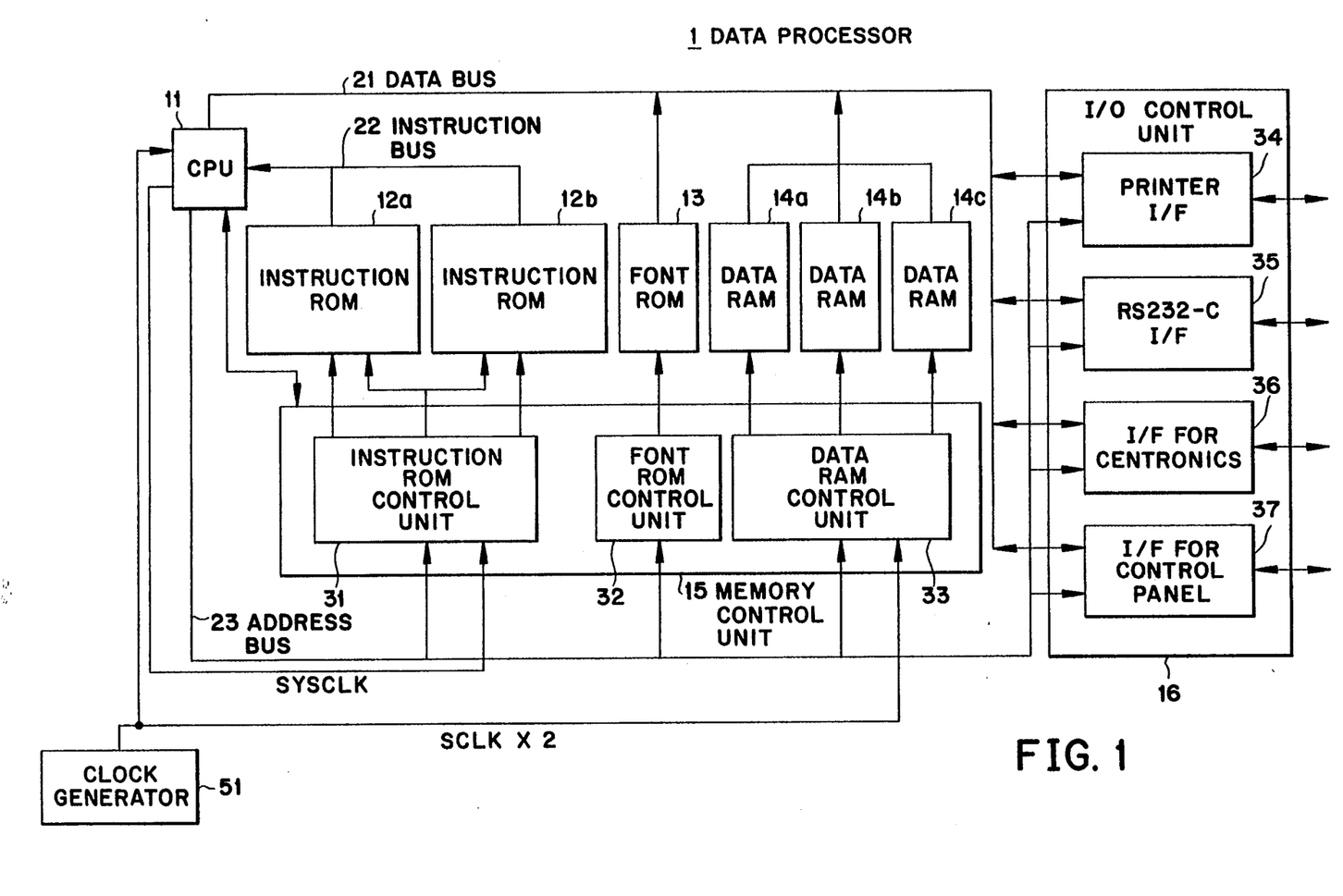
FIG. 1 is a block diagram of a data processor according to the present invention.

Referring to FIG. 1, a data processor 1 includes a CPU 11, instruction ROMs 12a and 12b, a font ROM 13, data RAMs 14a–14c, a memory control unit 15, an input/output control unit 16, and a data bus 21, an instruction bus 22 and an address bus 23 that connect those units, other control lines and the like.

CPU 11 has a so-called Harvard architecture that one instruction can be processed in one clock cycle and that the instruction bus and the data bus are controllable separately from and independently of each other.

This embodiment employs an Am29000 processor manufactured by Advanced Micro Devices, Inc., as CPU 11. The Am29000 processor is an RISC (Reduced Instruction Set Computer) type CPU that can make a burst mode access and has three 32-bit buses (data bus, instruction bus and address bus). In a burst mode, an instruction ROM control unit 31 to be described later latches an initial value A2–A24 of an address output from CPU 11, then generates a count-up address on the basis of the latched address value, and outputs the generated count-up address as an address signal to instruction ROMs 12a and 12b. Further, the Am29000 processor operable at 16 MHz will now be operated at 12.5 MHz.

An instruction ROM 12 is a read only memory for storing an instruction therein and includes two banks 12a and 12b.

As those instruction ROMs 12a and 12b, an inexpensive EPROM (Erasable and Programmable Read Only Memory) with an access time of approximately 120 ns and a set-up time of approximately 50 ns is used, which is accessed with no wait states by a bank interleave method. In this bank interleave mode, instruction ROMs 12a and 12b are alternately accessed. Either one or both of instruction ROMs 12a and 12b are described as "instruction ROM 12".

Font ROM 13 is a read only memory for storing fonts therein and is accessed via data bus 21 from CPU 11.

Data RAMs 14a–14c are readable and writable memories for storing data, programs or the like therein and access with one wait state a popular inexpensive DRAM having an access time of approximately 100 ns.

Any or all of those data RAMs 14a–14c are described as a "data RAM 14".

Memory control unit 15 includes an instruction ROM control unit 31, a font ROM control unit 32 and a data RAM control unit 33 in order to control instruction ROM 12, font ROM 13 and data RAM 14, respectively.

Instruction ROM control unit 31 controls instruction ROMs 12a and 12b to make access with no wait states by the interleave method.

Data RAM control unit 33 controls data RAMs 14a–14c to make access with one wait state.

Memory control unit 15 is constituted by a gate array with approximately 2000 gates. Instruction ROM control unit 31 and data RAM control unit 33 will be described later.

A clock generator 51 generates a clock signal SCLK×2 with a frequency of 25 MHz and applies the same to CPU 11 and data ROM control unit 33. The clock signal SCLK×2 is frequency-demultiplied in CPU 11 and then converted into a system clock signal SYSCLK with a frequency of 12.5 MHz. CPU 11 carries out such a processing as execution of an instruction in synchronization with system clock signal SYSCLK, and also applies system clock signal SYSCLK to instruction ROM control unit 31.

Input/output control unit 16 is used for an interface with external units, and includes a printer interface 34 for carrying out data transmission to and from a printer engine and also respective interfaces 35–37 for RS232-C, Centronics and an operator control panel.

Figure 2:
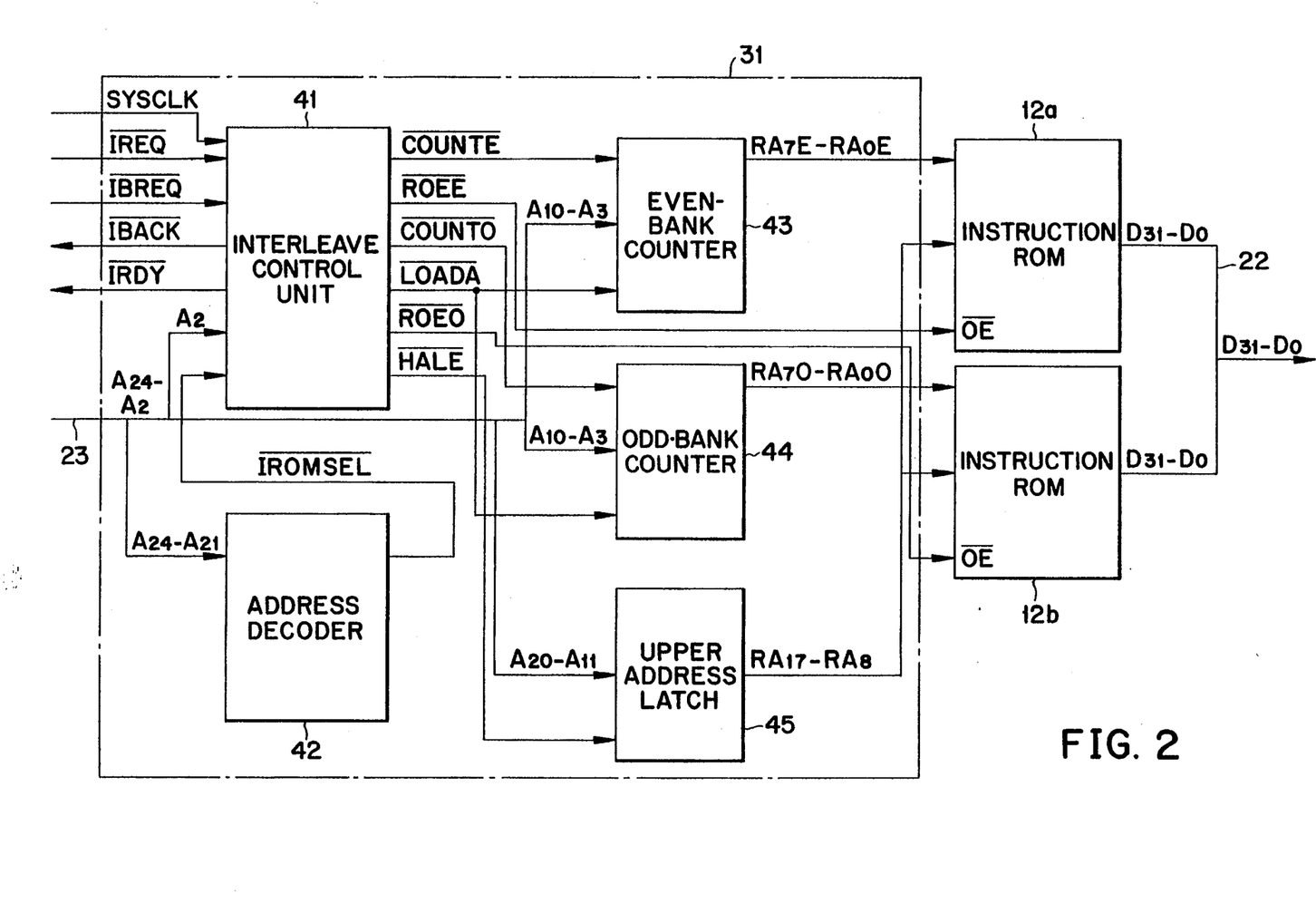
FIG. 2 is a block diagram showing one example of an instruction ROM control unit.

Description will now be given on the structure and operation of instruction ROM control unit 31 with reference to FIGS. 2 and 3. Referring to the figures, the bars written over the names of respective signals denote that the signals are low active.

Instruction ROM control unit 31 includes an interleave control unit 41, an address decoder 42, a counter 43 for even banks, a counter 44 for odd banks, and an upper address latch 45.

Interleave control unit 41 controls counter 43 for even banks, counter 44 for odd banks and upper address latch 45, transmits and receives signals to and from CPU 11, and outputs an enable signal to each of instruction ROMs 12a and 12b.

Address decoder 42 decodes an address signal A2-4–A2 applied from CPU 11. If the applied address signal is an address signal for specifying instruction ROM 12, address decoder 42 renders an output signal $\overline{\text{IROMSEL}}$ active and enables interleave control unit 41.

Counters 43 and 44 initially accept as an initial value an address signal A10–A3 of lower order 8 bits out of address signal A24–A2 from CPU 11, count-up in response to a signal $\overline{\text{COUNTE}}$ or a signal $\overline{\text{COUNTO}}$ which is alternately output for each one clock cycle from interleave control unit 41, and output the count value as respective address signals RA7E–RA0E and RA7O–RA0O of lower order 8 bits to respective instruction ROMs 12a and 12b.

Upper address latch 45 latches an address signal A20–A11 of higher order 10 bits out of address signal A24–A2 from CPU 11 in response to a signal $\overline{\text{HALE}}$ output from interleave control unit 41 and outputs the latched content as an address signal RA17–RA8 of higher order 10 bits to each of instruction ROMs 12a and 12b.

Latching an address by upper address latch 45 enables a correct addressing for instruction ROM 12 even when address bus 23 is thereafter opened for data.

When CPU 11 accesses instruction ROM 12, a signal $\overline{\text{IREQ}}$ being an instruction access request signal is output to instruction ROM control unit 31. Accordingly, address bus 23 is occupied for an instruction during the cycles of S0, S1 and S2 in FIG. 3.

A little after the output of signal $\overline{\text{IREQ}}$, a signal $\overline{\text{IBREQ}}$ being a burst request signal is output from CPU 11. In response to the output of signal $\overline{\text{IBREQ}}$, instruction ROM control unit 31 returns a signal $\overline{\text{IBACK}}$ indicating that a burst mode is available to CPU 11 during a first cycle of S2.

This causes an operation in the burst mode and thus prevents address bus 23 from being occupied for an instruction. Accordingly, address bus 23 can be opened for the access of data RAM 14, i.e., for data.

Further, if signal $\overline{\text{HALE}}$ is rendered active in instruction ROM control unit 31, upper addresses are latched by upper address latch 45 in the cycle S1. If a signal $\overline{\text{IRDY}}$ is returned to CPU 11 in the next cycle S2, address bus 23 is opened.

By receiving signal $\overline{\text{IRDY}}$, CPU 11 can accept instructions (REDATA, RODATA) from instruction ROM 12. That is, CPU 11 is in a wait state during the period for which signal $\overline{\text{IRDY}}$ is not active. Accordingly, delaying the timing to render signal $\overline{\text{IRDY}}$ active makes it possible to increase an appropriate number of wait states in CPU 11.

After that, the burst mode by a bank interleave is activated in the order of the cycle S2, S3, S2 . . . , so that the instruction (data) stored in instruction ROM 12 is read into CPU 11 with no wait states at the time of termination of each clock cycle. CPU 11 processes one instruction in one clock cycle by its internal pipeline processing.

Figure 3:
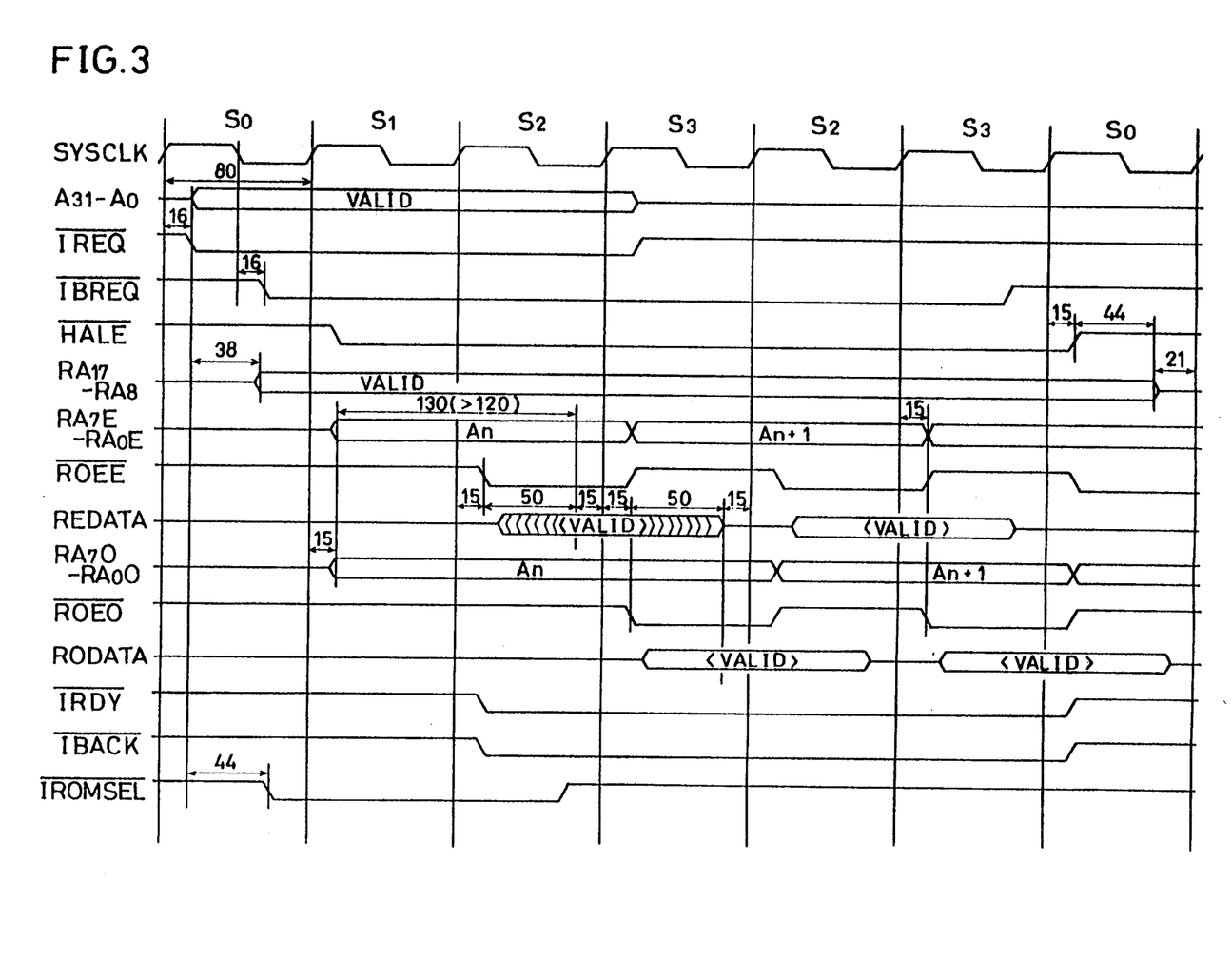
FIG. 3 is a timing chart of respective portions of the instruction ROM control unit.

In order that CPU 11 reads an instruction, at least an 8 ns time is necessary before the termination of each clock cycle by a system clock signal SYSCLK; however, since clock frequencies are 12.5 MHz, a 15 ns or more time is retained as shown in FIG. 3 even in view of access time and set-up time of instruction ROM 12, delay time of a logic circuit, and the like.

That is, despite the fact that an inexpensive EPROM with a slow access time is used as instruction ROM 12, one instruction can be executed in one clock cycle, and the almost maximal performance of the Am29000 processor, which is the RISC type CPU can be achieved.

Figure 4:
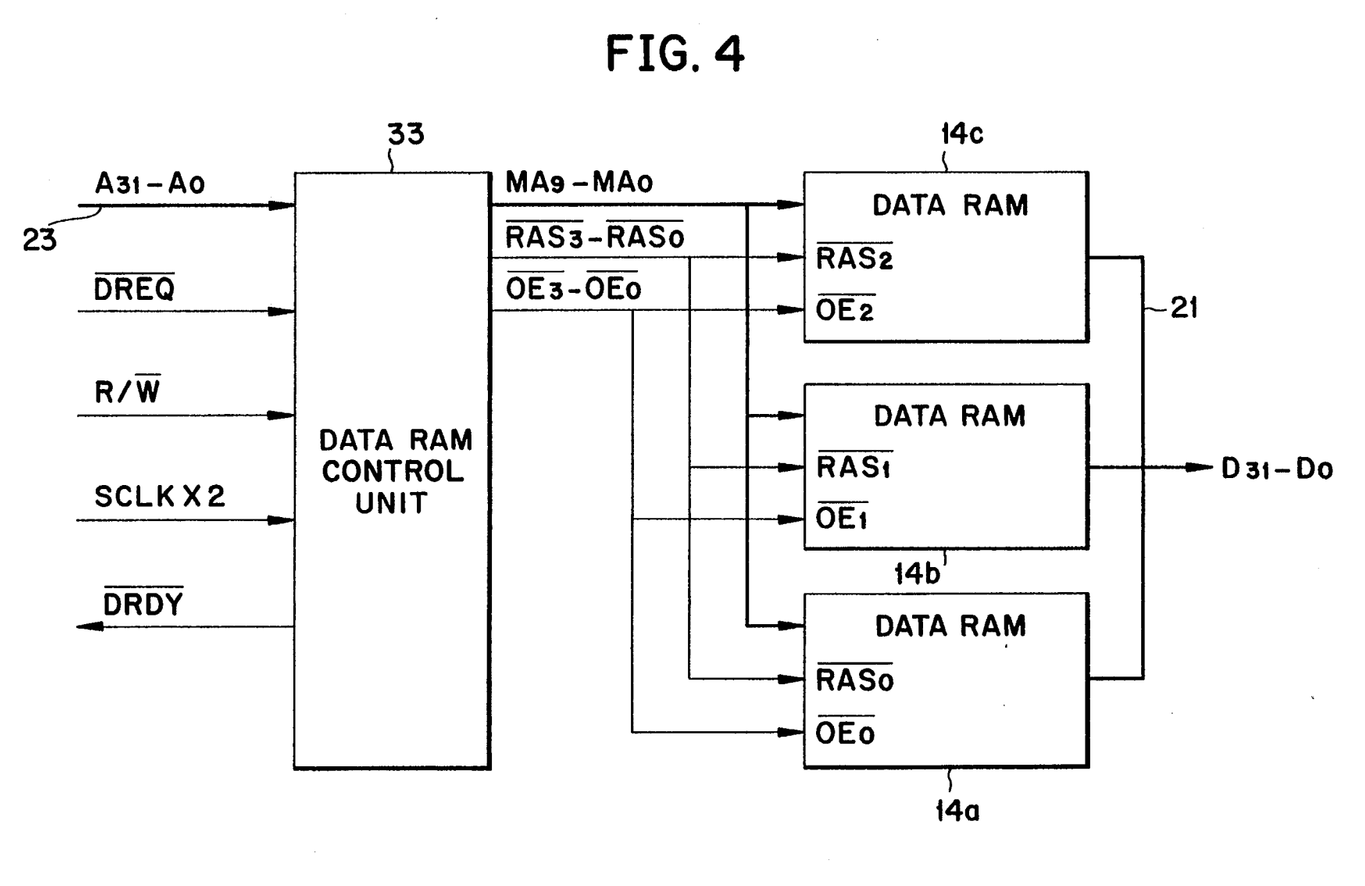
FIG. 4 is a block diagram showing one example of input/output signals to a data RAM control unit.
Figure 5:
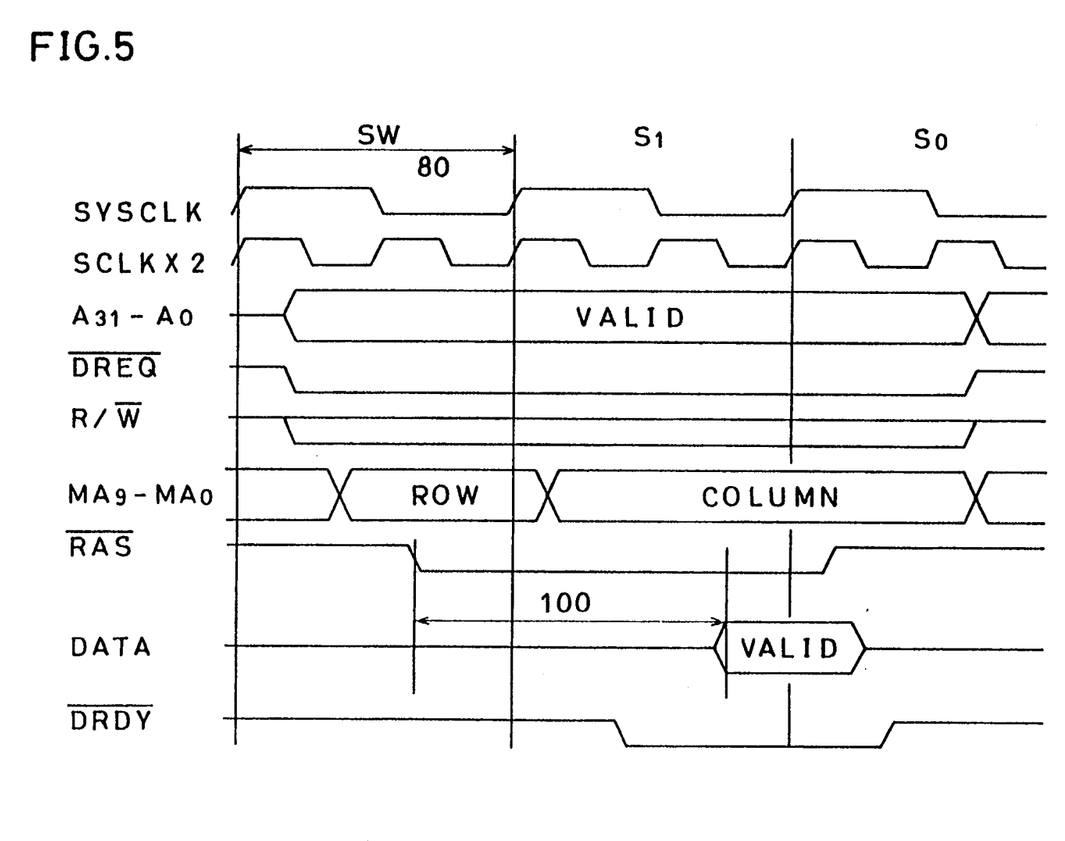
FIG. 5 is a timing chart of signals of the data RAM control unit.

Description will now be given on the part directly related to the access of data RAM 14 in the structure and operation of data RAM control unit 33 with reference to FIGS. 4 and 5.

When CPU 11 accesses data RAM 14, a signal $\overline{\text{DREQ}}$ being a data access request signal is output to data RAM control unit 33. In response to this, CPU 11 executes data reading and data writing at the time of the termination of the cycle S1 in which a signal $\overline{\text{DRDY}}$ is returned from data RAM control unit 33 to CPU 11.

More specifically, since CPU 11 is in the wait state while signal $\overline{\text{DRDY}}$ is not active, the number of wait states is increased by delaying the timing to render signal $\overline{\text{DRDY}}$ active. Accordingly, a necessary access time (100 ns) is ensured in data RAM 14.

Signals $\overline{\text{RAS}}$, $\overline{\text{CAS}}$, $\overline{\text{OE}}$, $\overline{\text{WE}}$ and the like are provided on the control line extending from data RAM control unit 33 to data RAM 14. These signals are produced on the basis of a clock signal SCLK×2 with a frequency double that of system clock signal SYSCLK.

In such a manner, CPU 11 makes access to data RAM 14 with one wait state.

While CPU 11 in data processor 1 according to this embodiment makes access to instruction ROM 12 with no wait states and to data RAM 14 with one wait state as described above, the following effects are caused by such access.

Figure 6:
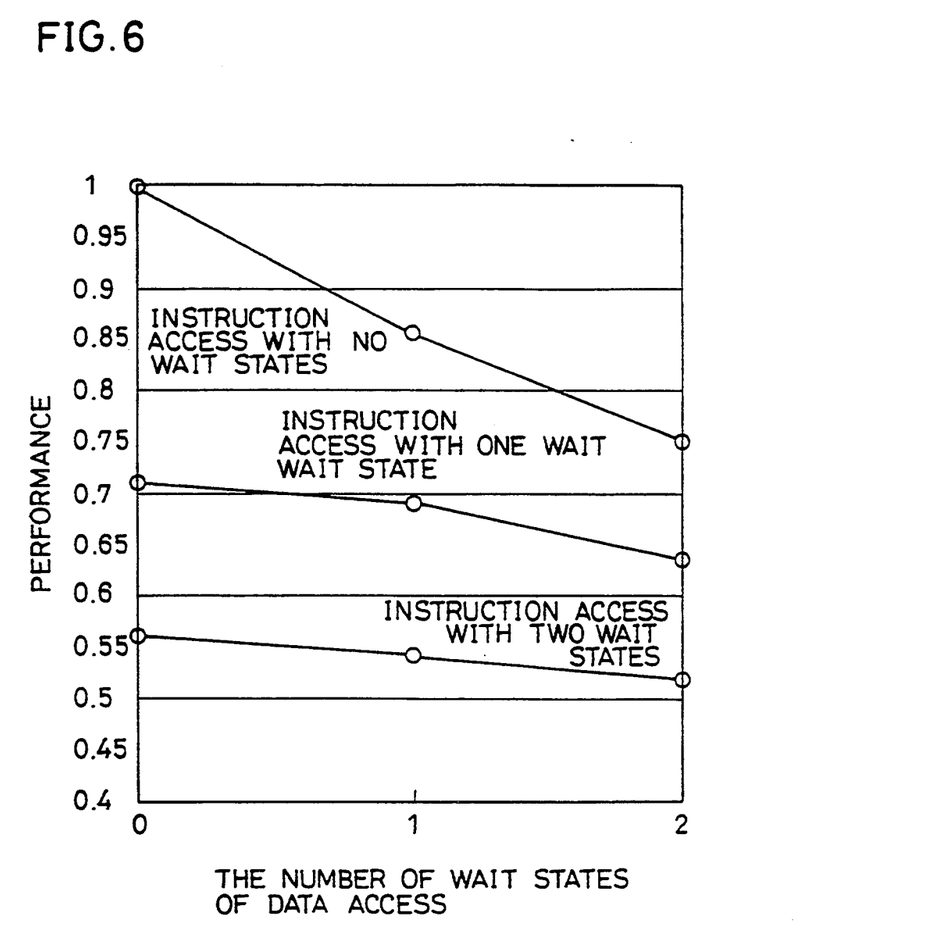
FIG. 6 is a diagram showing the relationship between the number of wait states and performance.

FIG. 6 is a graph showing the number of wait states and performance.

In the figure, the abscissa indicates the number of wait states of data access, and the ordinate indicates the performance (processing speed) of CPU 11 in the case where an access with no wait states is "1". The graph shows respective cases where the number of wait states of instruction access is 0, 1 and 2. The graph is based on data obtained by 5000 simulations by employing Drystone benchmark.

With reference to FIG. 6, the highest processing speed is achieved when both the instruction and the data are accessed with no wait states. In that case, a high speed SRAM is required as data RAM 14, resulting in an increase in cost and an increase in the scale of the processor due to an increase in the number of chips.

However, according to this embodiment, if one wait state is set in the data access, then a DRAM can be used as data RAM 14, and the cost and the size of the processor can be reduced. In addition, the processing speed is "0.85" which is suppressed to a decrease by approximately 15%. Further, although the instruction access is made with no wait states, an inexpensive EPROM can be used by the bank interleave method, resulting in a decrease in cost.

If a wait state is set in the instruction access, the processing speed substantially decreases by approximately 28% in one wait state and approximately 43% in two wait states. If two wait states are set in the data access, the processing speed decreases by approximately 24% in no wait states, approximately 37% in one wait state and approximately 47% in two wait states.

If instruction ROM 12 and data RAM 14 are accessed with no wait states and one wait state, respectively as described above, an increase in clock frequencies and thus an increase in the cost of memory devices or the like are suppressed. Also, the almost maximal performance of CPU 11 can be achieved, thereby increasing the processing speed.

Further, while the frequency of system clock signal SYSCLK is set to 12.5 MHz which is lower than 16 MHz of the rated frequency of CPU 11 in this embodiment, the following effects are caused by the frequency setting.

Figure 7:
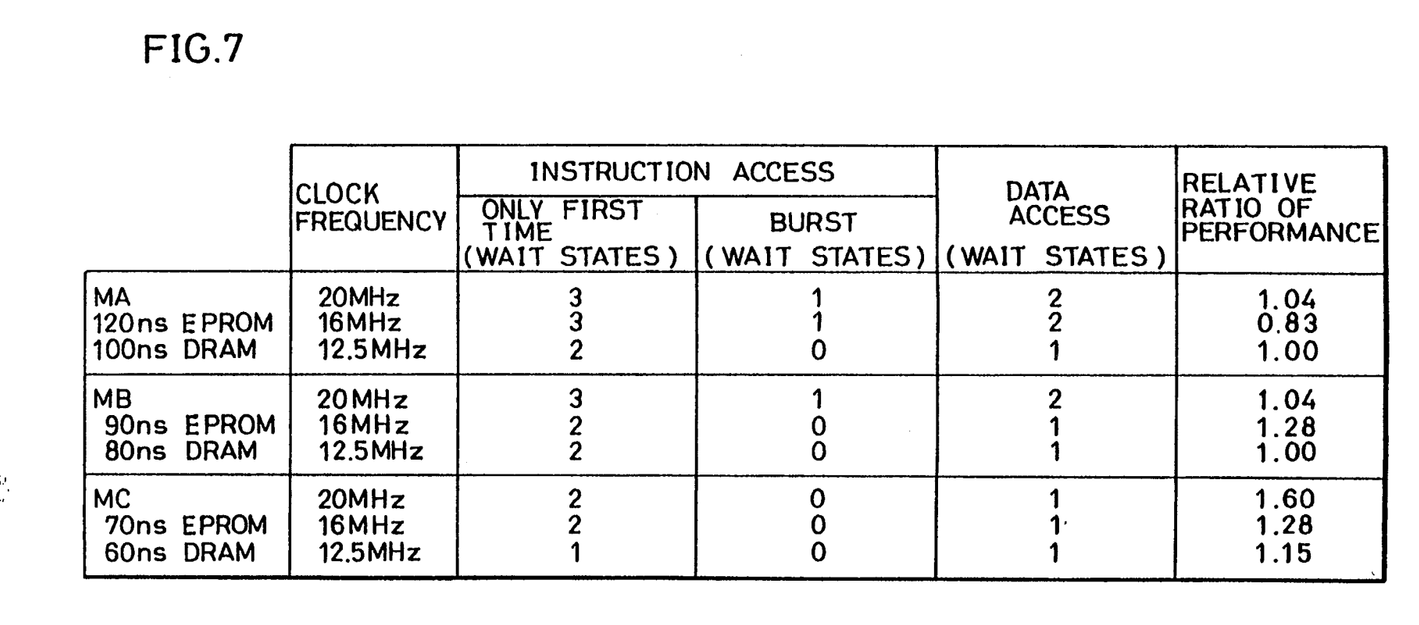
FIG. 7 is a diagram showing the relationship between combination of clock frequencies and memory access times and performance.

FIG. 7 is a diagram showing the relationship between combination of clock frequencies and memory access times and performance.

Referring to FIG. 7, an EPROM with an access time of 120 ns and a DRAM with an access time of 100 ns are selected as presently popular products MA, an EPROM with an access time of 90 ns and a DRAM with an access time of 80 ns are selected as products MB which will be popular products later, and an EPROM with an access time of 70 ns and a DRAM with an access time of 60 ns are selected as products MC which will be popular products in turn in the future.

According to the table of FIG. 7, with respect to products MA, when the clock frequency is 20 MHz, the performance (processing speed) is "1.04" which is hardly increased as compared to "1" at 12.5 MHz. The number of wait states is "1" at the time of instruction access and "2" at the time of data access, which values are both increased as compared to the value at 12.5 MHz. This results in a complicated structure of a system and a higher cost.

When the clock frequency is 16 MHz, the same number of wait states as that at 20 MHz is required, which number is higher than the number at 12.5 MHz. Thus, the performance is decreased to "0.83".

More specifically, even if the clock frequency is increased in order to increase the processing speed, the number of useless wait states is increased, thereby decreasing the processing speed. In the RISC type CPU, the processing speed is not so decreased in the case where the clock frequency is decreased and access is made with almost no wait states rather than the case where the clock frequency is increased and the number of useless wait states is increased in the same circuit configuration.

On the other hand, in a conventional CISC type CPU, for example, an enhancement in performance such as an increase in processing speed is achieved in the case where the clock frequency is increased even if the number of the wait states is increased.

As has been described above, in this embodiment, RISC type CPU 11 is employed and operated at a frequency of 12.5 MHz lower than the rated frequency of 16 MHz, whereby useless wait states in accessing instruction ROM 12 and data RAM 14 are eliminated and the number of wait states is decreased. This makes it possible to obtain the maximal performance, increase the processing speed and facilitate the circuit design.

Similarly, the maximal performance is obtained at 16 MHz and 20 MHz in products MB and MC, respectively in FIG. 7. If the present CPU 11 is operated at 16 MHz at the time when such high-speed memory devices are propagated, then the processing speed can easily be increased without any changes in circuits of data processor 1 or an increase in cost.

In the foregoing embodiment, other various changes can be made in the structure of instruction ROM control unit 31 and data RAM control unit 33, the bank structure of instruction ROMs 12a and 12b and data RAMs 14a-14c, memory capacities, address areas, and the structure of data processor 1 or the respective units therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor, comprising:
   a central processing unit including an instruction bus and a data bus controllable independently of each other and capable of processing one instruction in one clock cycle;
   an instruction memory connected to said instruction bus for storing an instruction to be executed by said central processing unit;
   a data memory connected to said data bus for storing data to be processed by said central processing unit in accordance with said instruction;
   first control means for controlling said central processing unit to make access to said instruction memory with no wait states; and
   second control means for controlling said central processing unit to make access to said data memory with one wait state.

2. The data processor according to claim 1, wherein said instruction memory includes a plurality of banks, and
   said first control means controls said instruction memory so that said plurality of banks are accessed by turns by said central processing unit.

3. The data processor according to claim 1, wherein said central processing unit applies address information of said instruction memory to said first control means, and
   said first control means controls said instruction memory to increment said address information in a predetermined cycle and access an address corresponding to the incremented result.

4. The data processor according to claim 1, wherein said instruction memory comprises an EPROM.

5. The data processor according to claim 1, wherein said data memory comprises a DRAM.

6. The data processor according to claim 1, further comprising,
   an address bus for connecting said central processing unit and said first and second control means.

7. A data processor, comprising:
   clock signal generating means for generating a clock signal of a predetermined cycle;
   a RISC (Reduced Instruction Set Computer) type CPU for executing a predetermined program in synchronization with said clock signal and capable of processing one instruction in one clock cycle defined by said clock signal;
   an instruction memory for storing therein an instruction to be executed by said CPU;
   a data memory for storing therein data to be processed by said CPU in accordance with said instruction;
   first control means for controlling said CPU and said instruction memory so as to cause said CPU to make access to said instruction memory for each one clock cycle; and
   second control means for controlling said CPU and said data memory so as to cause said CPU to make access to said data memory for every two clock cycles.

8. The data processor according to claim 7, further comprising,
   an instruction bus for connecting said CPU and said instruction memory, and
   a data bus for connecting said CPU and said data memory.

9. The data processor according to claim 8, further comprising,
   an address bus for connecting said CPU and said first and second control means, wherein
   said CPU makes access to said instruction memory in a burst mode.

10. The data processor according to claim 9, wherein said instruction memory includes a plurality of banks, and said first control means controls said instruction memory by a bank interleave method.

11. A data processor, comprising:

clock signal generating means for generating a clock signal with a predetermined frequency;

central processing means including an instruction bus and a data bus for executing a predetermined program in synchronization with said clock signal and capable of processing one instruction in one cycle of said clock signal;

an instruction memory connected to said instruction bus for storing an instruction to be executed by said central processing means;

a data memory connected to said data bus for storing data to be processed by said central processing means in accordance with said instruction, said central processing means including means for generating an instruction access request signal and means for generating a data access request signal;

first control means for controlling said central processing means and said instruction memory so as to cause said central processing means to read the instruction stored in said instruction memory before time corresponding to said one cycle has elapsed after generation of said instruction access request signal; and second control means for controlling said central processing means and said data memory so as to cause said central processing means to write or read data into or from said data memory during a time period between the time that the time corresponding to said one cycle has elapsed and the time that time corresponding to a subsequent one cycle has elapsed, after generation of said data access request signal.

12. The data processor according to claim 11, wherein said central processing means includes an RISC type microprocessor, and said predetermined frequency is lower than a rated operating frequency of said microprocessor.

13. A data processor, comprising:

clock signal generating means for generating a clock signal of a predetermined cycle;

a RISC (Reduced Instruction Set Computer) type CPU including an instruction bus and a data bus controllable independently of each other for executing a predetermined program in synchronization with said clock signal and capable of processing one instruction in one clock cycle defined by said clock signal;

an instruction memory connected to said instruction bus and including a plurality of banks, each of said banks storing an instruction to be executed by said CPU;

a data memory connected to said data bus for storing data to be processed by said CPU in accordance with said instruction, said CPU including means for generating an instruction access request signal and means for generating a data access request signal, and making access to said instruction memory in a burst mode;

first control means for controlling said CPU and said instruction memory so as to cause said CPU to read the instruction stored in said instruction memory before time corresponding to said one cycle has elapsed after generation of said instruction access request signal, said first control means controlling said instruction memory by a bank interleave method; and second control means for controlling said CPU and said data memory so as to cause said CPU to write or read data into or from said data memory during a time period between the time that the time corresponding to said one cycle has elapsed and the time that time corresponding to a subsequent one cycle has elapsed, after generation of said data access request signal.

14. The data processor according to claim 13, wherein said first control means applies a first access permitting signal to said CPU before the time corresponding to said one cycle has elapsed after the generation of said instruction access request signal, said second control means applies a second access permitting signal to said CPU during the time period between the time that the time corresponding to said one cycle has elapsed and the time that the time corresponding to the subsequent one cycle has elapsed, after the generation of said data access request signal, and said CPU reads the instruction from said instruction memory in response to said first access permitting signal and writes or reads data into or from said data memory in response to said second access permitting signal.

15. A control method of a data processor, said data processor including, a central processing unit having an instruction bus and a data bus controllable independently of each other and capable of processing one instruction in one clock cycle, an instruction memory connected to said instruction bus for storing an instruction to be executed by said central processing unit, and a data memory connected to said data bus for storing data to be processed by said central processing unit in accordance with said instruction, said method comprising:

a first step of controlling said central processing unit to make access to said instruction memory with no wait states; and a second step of controlling said central processing unit to make access to said data memory with one wait state.

16. The control method according to claim 15, wherein said central processing unit makes access to said instruction memory in a burst mode in said first step.

17. The control method according to claim 16, wherein said instruction memory is controlled by a bank interleave method in said first step.

18. A data processor, comprising:

clock signal generating means for generating a clock signal of a predetermined cycle;

a microprocessor for executing a predetermined program in synchronization with said clock signal;

a memory for storing data therein; and control means connected to said microprocessor and said memory for controlling timing to write or read data into or from said memory in response to an access request signal generated from said microprocessor, said predetermined cycle being lower than a rated operating frequency of said microprocessor, said control means controlling said timing so that the number of wait states in making access to said memory is lower than the number of wait states required for making access to said memory when said microprocessor is operated at the rated operating frequency.

19. The data processor according to claim 18, wherein said microprocessor comprises an RISC (Reduced Instruction Set Computer) type CPU capable of processing one instruction in one clock cycle defined by said clock signal.

20. The data processor according to claim 19, wherein said memory comprises a DRAM.

21. The data processor according to claim 18, wherein said memory includes, an instruction memory connected via an instruction bus to said microprocessor, for storing an instruction instructing the processing content to be executed by said microprocessor, and a data memory connected via a data bus to said microprocessor, for storing data to be processed by said microprocessor in accordance with said instruction.

22. The data processor according to claim 21, wherein said control means controls said microprocessor, said instruction memory and said data memory so that the number of wait states in making access to said data memory is higher than the number of wait states in making access to said instruction memory.

23. The data processor according to claim 21, wherein said microprocessor comprises an RISC (Reduced Instruction Set Computer) type CPU capable of processing one instruction in one clock cycle defined by said clock signal, and said control means controls said microprocessor so as to make access to said instruction memory with no wait states and to said data memory with one wait state.

24. A data processor, comprising:

clock signal generating means for generating a clock signal of a predetermined cycle;

a microprocessor capable of processing one instruction in one clock cycle defined by said clock signal and executing a predetermined program in synchronization with said clock signal;

a memory for storing data therein, wherein time required to make access to said memory is longer than one cycle of a rated operating frequency of said microprocessor; and control means connected to said microprocessor and said memory for controlling timing to write or read data into or from said memory in response to an access request signal generated from said microprocessor, said predetermined cycle being lower than the rated operating frequency of said microprocessor, said control means controlling said timing so that the number of wait states in making access to said memory is lower than the number of wait states required for making access to said memory when said microprocessor is operated at the rated operating frequency.

25. The data processor according to claim 24, wherein said memory includes, an instruction memory connected via an instruction bus to said microprocessor, for storing an instruction instructing the processing content to be executed by said microprocessor, and a data memory connected via a data bus to said microprocessor, for storing data to be processed by said microprocessor in accordance with said instruction.

26. The data processor according to claim 25, wherein said control means controls said microprocessor, said instruction memory and said data memory so as to cause said microprocessor to access said instruction memory with no wait states and said data memory with one wait state.

27. The data processor according to claim 26, wherein said instruction memory includes a plurality of banks, and said control means controls said instruction memory to cause said microprocessor to access said plurality of banks by turns.

28. The data processor according to claim 27, wherein said microprocessor applies address information of said instruction memory to said control means, and said control means controls said instruction memory to increment said address information in a predetermined cycle and to access an address corresponding to the incremented result.

* * * * *